United States Patent [19]

Strolle et al.

[11] Patent Number: 5,835,532
[45] Date of Patent: Nov. 10, 1998

[54] BLIND EQUALIZER FOR A VESTIGIAL SIDEBAND SIGNAL

[75] Inventors: Christopher Hugh Strolle, Glenside, Pa.; Steven Todd Jaffe, Freehold, N.J.

[73] Assignee: RCA Thomson Licensing Corporation, Princeton, N.J.

[21] Appl. No.: 704,789

[22] PCT Filed: Mar. 13, 1995

[86] PCT No.: PCT/US95/03132

§ 371 Date: Sep. 5, 1996

§ 102(e) Date: Sep. 5, 1996

[87] PCT Pub. No.: WO95/26075

PCT Pub. Date: Sep. 28, 1995

[30] Foreign Application Priority Data

Mar. 21, 1994 [GB] United Kingdom .................. 9405487

[51] Int. Cl.[6] .................................................. H04N 7/04
[52] U.S. Cl. ......................... 375/233; 375/321; 455/204; 358/725
[58] Field of Search ................................... 375/229, 230, 375/270, 321, 243, 254, 232, 233, 340, 341, 259, 277, 301; 455/204, 203, 109; 329/357; 348/426, 725, 470, 537, 326; 364/724.2; 333/28 R

[56] References Cited

U.S. PATENT DOCUMENTS 4,227,152 10/1980 Godard et al. ............................ 375/13
4,309,770 1/1982 Godard ..................................... 375/14

(List continued on next page.)

OTHER PUBLICATIONS

Benveniste et al, Blind Equalizers, IEEE Transactions on Communications, vol. Com–32 No. 8, Aug. 1994.
Liu et al., *Simulation and Implementation of US QAM–Based HDTV Channel Decoder,* IEEE Transaction on Consumer Electronics, Aug. 1993, pp. 676–682.

The Grand Alliance HDTV System Specification (Draft Document) submitted to the ACATS Technical Subgroup, as published in the 1994 Proceedings of the 48th Annual Broadcast Engineering Conf. Proceedings Mar. 20–24, 1994.

Jablon, *Joint Blind Equalization, Carrier Recovery, and Timing Recovery for High–Order QAM Signal Constellations,* IEEE Transaction on Signal Processing, Jun. 1992, pp. 1383–1397.

Citta et al., *The Digital Spectrun Compatible HDTV Transmission System,* IEEE Transactions on Consumer Electronics, Aug. 1991, pp. 469–475.

Goddard, Self–Recovering Equalization and Carrier Tracking in Two–Dimensional Data Communication Systems, IEEE Transactions on Communications, Nov. 1980, pp. 1867–1875.

(List continued on next page.)

*Primary Examiner*—Chi H. Pham
*Assistant Examiner*—William Luther
*Attorney, Agent, or Firm*—Joseph S. Tripoli; Eric P. Herrmann; Ronald H. Kurdyla

[57] ABSTRACT

A television signal receiver for processing an HDTV signal transmitted in a vestigial sideband (VSB) format with a one dimensional data constellation includes a first carrier recovery network (18), an equalizer (20), and a second carrier recovery network (22, 30, 62). A multiple stage quantizer network (50, 66) exhibiting progressively finer resolution is associated with the operation of the equalizer for providing blind equalization without need of a "training" signal. The second carrier recovery network includes a phase detector (30) wherein a one symbol delayed (312) input signal and a quantized (310) input signal are multiplied (316), and an unquantized input signal and a quantized (310) one symbol delayed (314) input signal are multiplied (318). Signals produced by the multiplication are subtractively combined (320) to produce an output signal representing a carrier phase error.

16 Claims, 4 Drawing Sheets

U.S. PATENT DOCUMENTS

| | | |
|---|---|---|
| 4,438,521 | 3/1984 | Mattei ........................................ 375/16 |
| 5,040,191 | 8/1991 | Forney, Jr. et al. ....................... 375/39 |
| 5,134,477 | 7/1992 | Knauer et al. ........................... 358/136 |
| 5,263,033 | 11/1993 | Seshadri ................................... 371/43 |
| 5,287,180 | 2/1994 | White ..................................... 348/484 |
| 5,297,166 | 3/1994 | Batruni .................................... 375/14 |
| 5,311,546 | 5/1994 | Paik et al. ................................ 375/14 |
| 5,363,408 | 11/1994 | Paik et al. ................................ 375/39 |
| 5,386,239 | 1/1995 | Wang et al. ............................ 348/472 |
| 5,396,518 | 3/1995 | How ....................................... 375/265 |
| 5,398,073 | 3/1995 | Wei ........................................ 348/487 |
| 5,537,440 | 7/1996 | Eyuboglu et al. ...................... 375/343 |
| 5,706,057 | 1/1998 | Strolle et al. .......................... 348/426 |

OTHER PUBLICATIONS

Proakis, *Digital Signaling Over a Bandwidth–Constrained Linear Filter Channel,* Digital Communications (Second Edition), McGraw–Hill, pp. 587–593.

Ungerboeck et al, *Trellis–Coded Multidimensional Phase Modulation,* IEEE Transactions on Information Theory, vol. 36, No. 1, issued Jan. 1990, pp. 63–89.

Proakis et al, *A "Quantized" Channel Approach to Blind Equalization,* Supercomm/ICC '92: Discovering a New World of Communications, 1992, pp. 1539–1543.

Williamson et al, *Quantization Issues in Blind Equalisation: A Case Study,* Communications, Computers and Signal Processing, 1991, May 9–10, 1991, pp. 657–660.

| | | | | | | | | |
|---|---|---|---|---|---|---|---|---|
| ORIGINAL VSB DATA CONSTELLATION | -7 | -5 | -3 | -1 | 1 | 3 | 5 | 7 |
| | | | | | | | | |
| FIRST CLUSTERS | [-7 | -5 | -3 | -1] | [1 | 3 | 5 | 7] |
| DECISION REGIONS | [-INF., 0] | | | | [0, +INF] | | | |
| DECISION DEVICE OUTPUTS | -4 | | | | 4 | | | |
| | | | | | | | | |
| SECOND CLUSTERS | [-7 | -5] | [-3 | -1] | [1 | 3] | [5 | 7] |
| DECISION REGIONS | [-INF. -4] | | [-4 0] | | [0 4] | | [4 INF.] | |
| DECISION DEVICE OUTPUTS | -6 | | -2 | | 2 | | 6 | |
| | | | | | | | | |
| THIRD CLUSTERS | [-7] | [-5] | [-3] | [-1] | [1] | [3] | [5] | [7] |
| DECISION REGIONS | [-INF, -6] | [-6, -4] | [-4, -2] | [-2, 0] | [0, 2] | [2, 4] | [4, 6] | [6, INF] |
| DECISION DEVICE OUTPUTS | -7 | -5 | -3 | -1 | 1 | 3 | 5 | 7 |

FIG. 4

BLIND EQUALIZER FOR A VESTIGIAL SIDEBAND SIGNAL

FIELD OF THE INVENTION

This invention concerns a digital signal processing system. In particular, the invention concerns a blind equalizer for a vestigial side band (VSB) video signal such as may be modulated with high definition television (HDTV) information, for example.

BACKGROUND OF THE INVENTION

A VSB signal and a Quadrature Amplitude Modulated (QAM) signal are both forms of a Pulse Amplitude Modulated (PAM) signal. A QAM signal conveying digital information is represented by a two-dimensional data symbol constellation defined by Real and Imaginary axes. In contrast, a VSB signal is represented by a one-dimensional data symbol constellation wherein only one axis contains quantized data to be recovered at a receiver.

The recovery of data from VSB or QAM signals at a receiver requires the implementation of three functions: timing recovery for symbol synchronization, carrier recovery (frequency demodulation) and equalization. Timing recovery is the process by which the receiver clock (timebase) is synchronized to the transmitter clock. This permits the received signal to be sampled at the optimum point in time to reduce the chance of a slicing error associated with decision-directed processing of received symbol values. Carrier recovery is the process by which a received RF signal, after being frequency shifted to a lower intermediate frequency passband (eg., near-baseband), is frequency shifted to baseband to permit recovery of the modulating baseband information.

One example of a VSB system is the Grand Alliance HDTV transmission system recently proposed for the United States. This system employs a VSB digital transmission format for conveying a packetized datastream, and is being evaluated in the United States by the Federal Communications Commission through its Advisory Committee of Advanced Television Service (ACATS). A description of the Grand Alliance HDTV system as submitted to the ACATS Technical Subgroup on Feb. 22, 1994 (draft document) is found in the 1994 Proceedings of the National Association of Broadcasters, 48th Annual Broadcast Engineering Conference Proceedings, Mar. 20–24, 1994.

Many modern digital data communications systems employ adaptive equalization to compensate for the effects of changing conditions and disturbances on the signal transmission channel. Equalization removes baseband intersymbol interference (ISI) caused by transmission channel disturbances including the low pass filtering effect of the transmission channel. ISI causes the value of a given symbol to be distorted by the values of preceding and following symbols. Equalization is typically performed on the near-baseband signal, before carrier recovery removes any residual frequency offsets from the near-baseband signal to produce a true baseband output signal. This function is typically performed by digital receiver circuits. Equalization is performed prior to carrier recovery baseband demodulation because the carrier recovery process typically is a decision-directed process (as known) that requires at least a partially open "eye" which is provided by the equalizing function.

An adaptive equalizer is essentially an adaptive digital filter. In systems using an adaptive equalizer, it is necessary to provide a method of adapting the filter response so as to adequately compensate for channel distortions. Several algorithms are available for adapting the filter coefficients and thereby the filter response. One widely used method employs the Least Mean Squares (LMS) algorithm. In this algorithm, by varying the coefficient values as a function of an error signal (E), the equalizer output signal is forced to approximately equal a reference data sequence. This error signal is formed by subtracting the equalizer output signal from the reference data sequence. As the error signal approaches zero, the equalizer approaches convergence whereby the equalizer output signal and the reference data sequence are approximately equal.

When the equalizer operation is initiated, the coefficient values (filter tap weights) are usually not set at values to achieve adequate compensation of channel distortions. In order to force initial convergence of the equalizer coefficients, a known "training" signal may be used as the reference signal. This signal is programmed at both the transmitter and receiver. The error signal is formed at the receiver by subtracting a locally generated copy of the training signal from the output of the adaptive equalizer. The training signal serves to open the initially occluded "eye" of the received signal, as known. After adaptation with the training signal, the eye has opened considerably and the equalizer is switched to a decision-directed operating mode. In this mode final convergence of the filter tap weights is achieved by using the actual values of symbols from the output of the equalizer instead of using the training signal. The decision directed equalizing mode is capable of tracking and cancelling time varying channel distortions more rapidly than methods using periodically transmitted training signals. In order for decision directed equalization to provide reliable convergence and stable coefficient values, approximately 90% of the decisions must be correct. The training signal helps the equalizer achieve this 90% correct decision level.

A problem arises when a training signal is not available. In such case "blind" equalization is often used to provide initial convergence of the equalizer coefficient values and to force the eye to open. Blind equalization has been extensively studied and used for QAM systems. Among the most popular blind equalizing algorithms are the Constant Modulus Algorithm (CMA) and the Reduced Constellation Algorithm (RCA). These algorithms are discussed, for example, in Proakis, *Digital Communications,* McGraw-Hill: New York, 1989 and in Godard, "Self-Recovering Equalization and Carrier Tracking in Two Dimensional Data Communication Systems," *IEEE Transactions on Communications,* November 1980.

The CMA and RCA algorithms are not directly applicable to VSB systems. The CMA relies on the fact that, at the decision instants, the modulus of the detected data symbols should lie on a locus of points defining one of several (constellation) circles of different diameters. This aspect of the CMA allows it to be used prior to carrier lock (baseband demodulation). The CMA inherently relies on the signal being processed to be two-dimensional, as in the case of a QAM signal which has in-phase and quadrature phase data bearing constellation components. The CMA is not directly applicable to a VSB signal because a VSB signal is represented by a one-dimensional data symbol constellation. The RCA relies on forming "super constellations" within the main transmitted constellation. The data signal is first forced to fit into a super constellation, then the super constellation is subdivided to include the entire constellation. The RCA typically requires a two-dimensional data constellation, whereas a VSB signal is one-dimensional data symbol constellation.

SUMMARY OF THE INVENTION

In accordance with the principles of the present invention, a blind equalizer which does not use the CMA or RCA algorithms is illustratively disclosed in the context of a television signal receiver for processing a High Definition Television signal. A multiple stage quantizer exhibiting progressively finer resolution is controllably associated with the operation of the equalizer for providing blind equalization without need of a "training" signal.

In an illustrated embodiment, the equalizer is preceded by a first carrier recovery network and followed by a second carrier recovery network, and the input signal to the system is a vestigial sideband (VSB) signal without a training component.

BRIEF DESCRIPTION OF THE DRAWINGS

In the drawing:

FIG. 4 illustrates a symbol decision process associated with a blind equalization process.

DETAILED DESCRIPTION OF THE DRAWINGS

Figure 1:
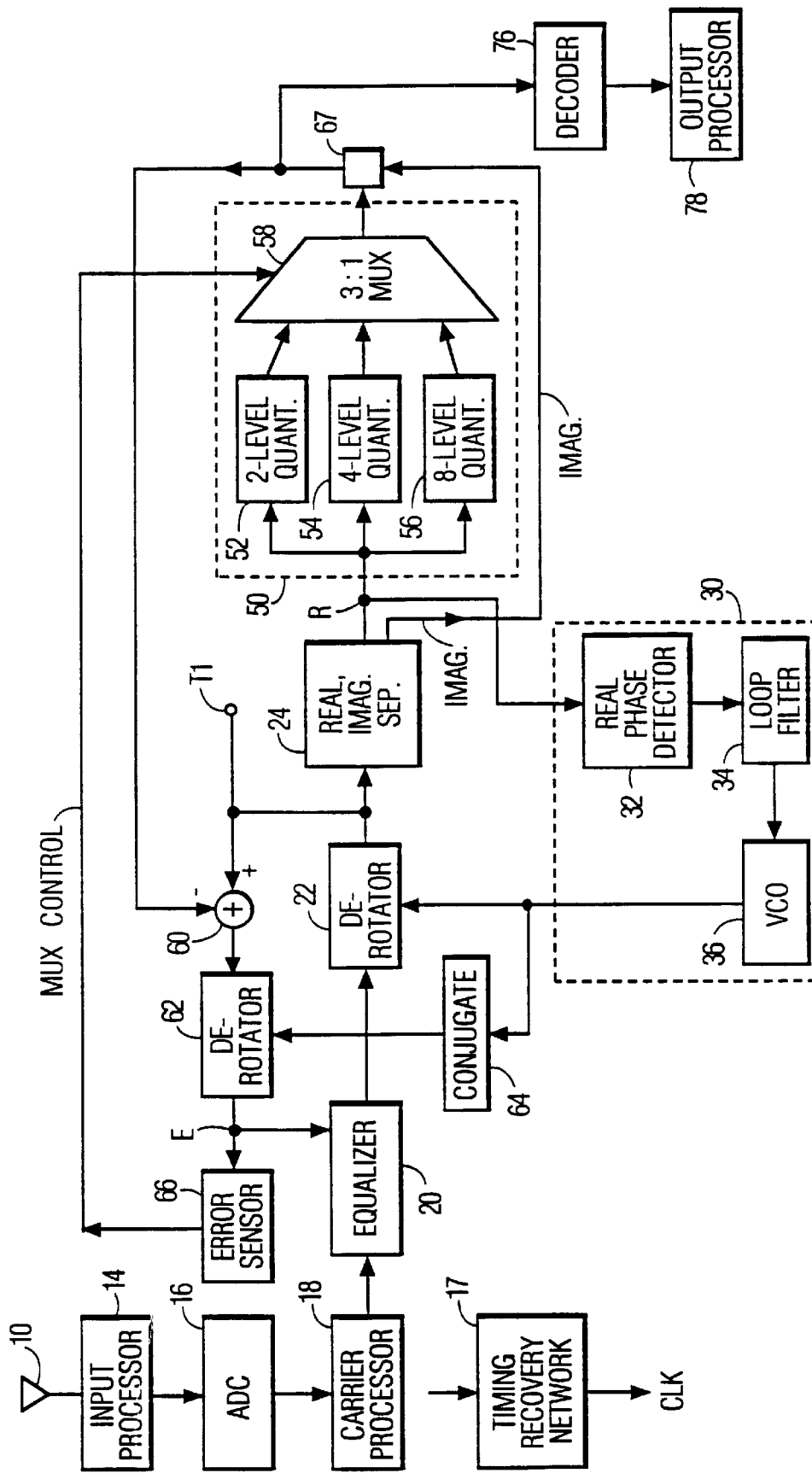
FIG. 1 is a block diagram of a portion of an advanced television receiver, such as an HDTV receiver, including an equalizer system in accordance with the principles of the invention.

In FIG. 1, a broadcast VSB modulated analog HDTV signal received by an antenna 10 is processed by an input network 14 including RF tuning circuits, a double conversion tuner for producing an intermediate frequency passband output signal, and appropriate gain control circuits, for example. The received VSB signal illustratively is an 8-VSB signal with a symbol rate of 10.76 Msymbols/second occupying a conventional NTSC 6 MHz frequency spectrum, in accordance with the Grand Alliance HDTV specification. The Nyquist bandwidth for this system is 5.38 MHz, with excess bandwidth of 0.31 MHz at each bandedge.

The passband output signal from input processor 14 is converted from analog to digital form by an analog-to-digital converter 16, which operates at a sample rate of 2 samples/symbol, for example. The received VSB signal in this example does not include a pilot component or a training component, and has been processed by unit 14 so that the center of the 6 MHz band is nominally situated at 5.38 MHz. The frequency spectrum of this signal at the input of ADC 16 occupies a range of 2.38 MHz to 8.38 MHz. When timing synchronization has been established by means of a timing recovery network 17, ADC unit 16 samples this signal at 21.52 MHz, which is twice the symbol rate. Timing recovery network 17 provides an output symbol clock (CLK) that is synchronized with a corresponding clock generated at a transmitter. Clock CLK is applied to ADC unit 16 and other elements of the receiver system. Techniques for achieving timing recovery are well known. One particularly advantageous timing recovery technique suitable for use by network 17 is disclosed in a copending U.S. patent application Ser. No. (RCA 87,588) of C. Strolle et al. titled Carrier Independent Timing Recovery System for a Vestigial Sideband Modulated Signal.

In the system to be discussed, the carrier frequency of the transmitted signal is nominally 5.38 MHz, the transmitted symbol frequency is nominally 10.76 Msymbols/sec, and the receiver sampling frequency is nominally 21.52 Mhz. At timing lock, the receiver sampling frequency is twice the transmitted symbol frequency. At carrier lock when demodulation to baseband results, the recovered carrier frequency is one-quarter of the receiver sampling frequency.

The digital signal from ADC unit 16 is applied to a carrier processor 18. Processor 18 includes a carrier recovery network of conventional design for providing a VSB output signal that is demodulated to near-baseband. Carrier recovery networks suitable for this purpose are known in the art. A particularly suitably carrier recovery network for use in unit 18 is described in a copending U.S. patent application of C. Strolle et al. Ser. No. (RCA 87,862) titled Carrier Recovery System for a Vestigial Sideband Signal. In the system to be discussed, demodulation to absolute baseband is accomplished by means of a blind equalizer network together with a second carrier recovery network, without reliance on a pilot signal to assist carrier recovery or a training signal to assist equalization. The input VSB signal to be processed is a complex signal with real and imaginary components, and may be of the type used by the Grand Alliance HDTV transmission system. Only the real component of the VSB signal contains data symbols to be recovered.

The near-baseband VSB output signal from processor 18 contains digital data as well as inter-symbol interference (ISI) caused by transmission channel disturbances and artifacts. This signal is applied to an input of a complex, adaptive feed-forward passband equalizer 20, eg., a fractionally spaced equalizer, which in this case is implemented as a digital FIR filter. Equalizer 20 operates in a "blind" mode during signal acquisition, and afterwards operates in a decision directed mode. The coefficient values (tap weights) of equalizer 20 are adaptively controlled by an Error signal "E" applied to a control input as will be discussed.

The algorithm employed for blind equalization determines appropriate decision regions for a VSB decision device so as to generate decisions which allow an adaptive equalizer to converge without using a training signal. It will be helpful to define several terms before describing the process of blind equalization in greater detail. A "decision region" is a continuous portion of the real number range and has upper and lower bounds. An "unbounded decision region" is a decision region with either positive infinity for an upper bound or negative infinity for a lower bound. A symbol point is situated in a decision region if it has a value less than the upper bound and greater than the lower bound. A decision region "spans" a symbol point if the symbol point is situated in the decision region. A "decision device," such as a quantizer, determines which decision region an incoming symbol point is in, and outputs a symbol corresponding to that decision region. A "step" is the distance between two adjacent symbols in a full constellation. As noted above, a VSB signal is essentially a one-dimensional data constellation wherein only one axis contains quantized symbol data to be recovered at a receiver.

In a VSB system, a decision region typically spans one data symbol of the full constellation. The upper and lower bounds of each decision region are set midway between the constellation sample points. If these decision regions are used for initial convergence of the equalizer, convergence will not occur because, due to the presence of ISI, significantly less than 90% of the decisions from the decision device will be correct.

A blind equalization algorithm, as will be discussed, determines new upper and lower decision region boundaries in the process of forcing some correct decisions to be made. The full VSB constellation is clustered into several sets, and upper and lower bounds for decision regions are determined. These first sets are subdivided into smaller sets until each set contains only one symbol and the decision regions correspond to typical VSB decision regions. Decision boundaries are typically located half-way between symbols within decision regions. Each decision stage, eg., a quantizer, allows a number of decisions to be correct so that the equalizer approaches convergence. Thus each decision stage in the blind equalization process serves to progressively open the "eye" of the VSB signal as convergence is approached.

The upper and lower bounds of each decision region are determined in the following manner. For a given cluster of symbols, the lower bound of a given decision region is set at a value that is one-half a step less than the value of the smallest symbol in that cluster. However, if the smallest symbol is the smallest valued symbol of the constellation, then the lower bound is set to negative infinity. The upper bound of the decision region is set at a value that is one-half a step greater than the value of the largest symbol in the cluster (unless the symbol is the largest valued symbol in the constellation, in which case the upper bound is set to a value of positive infinity). If an output symbol from the equalizer resides in one of these decision regions, the output of the decision device is taken to be the arithmetic mean of the data symbols of the associated cluster.

When a locally generated error signal is less than a predetermined quantizer threshold level, meaning that the decision region evaluation can be refined, the decision regions are changed by dividing each cluster of symbols in half. The upper and lower bounds of the new decision regions and the decision device output are recomputed in the manner described above.

The process described above is illustrated by the following example for an 8-VSB signal. The signal format adopted by the Grand Alliance HDTV system employs an 8-VSB signal having a one dimensional data constellation defined by the following eight data symbols:

–7 –5 –3 –1 +1 +3 +5 +7

This one-dimensional constellation is conveyed by the real, in-phase component of the VSB signal. With this symbol arrangement, the symbols are all evenly spaced two units apart, and data bits can be mapped to symbols without incurring a DC offset.

The blind equalization process example given above encompasses three stages, or levels, in which input data symbols are grouped or "clustered" three different ways and respectively subjected to progressively finer quantization steps by associated quantization decision devices. The first (coarse) clustering of the eight symbol VSB constellation points occurs at a first level of equalization involving a coarse quantization step, and produces two symbol clusters:

[–7, –5, –3, –1] and [1, 3, 5, 7]

For this operation the slice point of the quantizer is set to zero and the data sign (+ or –) is detected. The coarse quantization step decision regions for each of these clusters are respectively

[–infinity, 0] and [0, +infinity].

In this case the outputs of the coarse quantizer decision devices are respectively

[–4] [+4].

The next level of (finer) clustering at the next level of equalization produces the following four symbol clusters:

[–7, –5] [–3, –1] [1, 3] [3, 5]

The finer quantization step decision regions for these clusters are respectively

[–inf, –4] [–4, 0] [0, 4] [4, inf]

In this case the outputs of the finer resolution decision devices are respectively

[–6] [–2] [2] [6].

The last level of refinement at the last level of equalization produces symbol clusters

[–7] [–5] [–3] [–1] [1] [3] [5] [7]

with finest decision regions

[–inf, –6] [–6, –4] [–4, –2] [–2, 0] [0, 2] [2, 4] [4, 6] [6, inf].

The finest resolution decision device outputs are thus the full VSB constellation:

–7 –5 –3 –1 1 3 5 7.

The decision outputs produced by the quantizers are provided by an input-to-output mapper (look-up table). The use of such a mapper is well known in quantizer design. This example for an 8-VSB signal began with two clusters of four symbol samples. It could also have begun with one cluster of eight symbols. An analogous operation pertains to a 16-VSB signal. A 16-VSB signal may begin with four clusters of four symbols or with two clusters of eight symbols. As between successive coarse and finer regions, decision region values are typically related by a factor of one-half, but this relationship is not critical.

The process described above is summarized by FIG. 4, which shows clusters, decision regions and decision device outputs for blind equalization of an 8-VSB signal. These operations are performed by a network 50 in FIG. 1 as will be discussed, including quantizers 52, 54 and 56 and a multiplexer (MUX) 58 for providing an output datastream of time multiplexed symbols.

A modification of the processes described above may sometimes be necessary for VSB signals. A problem arises when some but not all of the decision regions in a set of decision regions are unbounded. For VSB signals the outermost positive and negative decision regions are unbounded. Due to transmission channel disturbances, it is possible that more points may fall into the unbounded regions than would normally be the case without channel distortions. This situation creates a bias in the output of the decision device. To overcome this bias, the range of the unbounded decision regions are shortened slightly, and the range of the bounded decision regions are simultaneously increased. These regions are shortened and lengthened by an amount needed to achieve the optimum offset values mentioned in the following paragraph. These values are usually a small percentage of the total decision region. This adjustment makes the selection of all decision regions equiprobable.

This bias adjusting procedure is illustrated by the following example, in the context of the 8-VSB system described above. In the four cluster stage for example, the decision region values are modified by multiplying by an offset scalar factor "$\Delta$" having a value slightly greater than unity, for example. The value of the offset may vary with the nature and requirements of a particular system. The purpose of the offset is to narrow the range of intermediate decision regions. The offset is not used with the outermost values at the positive and negative extremes of a decision region, eg., positive or negative infinity. Thus in the case of the second symbol clustering discussed above, the decision regions are modified as follows:

$$[-\inf., -4*\Delta] [-4*\Delta, 0] [0, 4*\Delta] [4*\Delta, +\inf.].$$

The decision device outputs are similarly modified:

$$-6*\Delta \ -2*\Delta \ 2*\Delta \ 6*\Delta$$

Optimum offset values for each stage of equalization (clustering level) are found by minimizing transients in the RMS error when the quantizer switches from two clusters to four clusters and from four clusters to eight clusters. These values are often empirically determined. In some cases the offset value of the output device and the offset value of the decision region may differ. Analogous observations apply to a 16-VSB signal.

Figure 2:
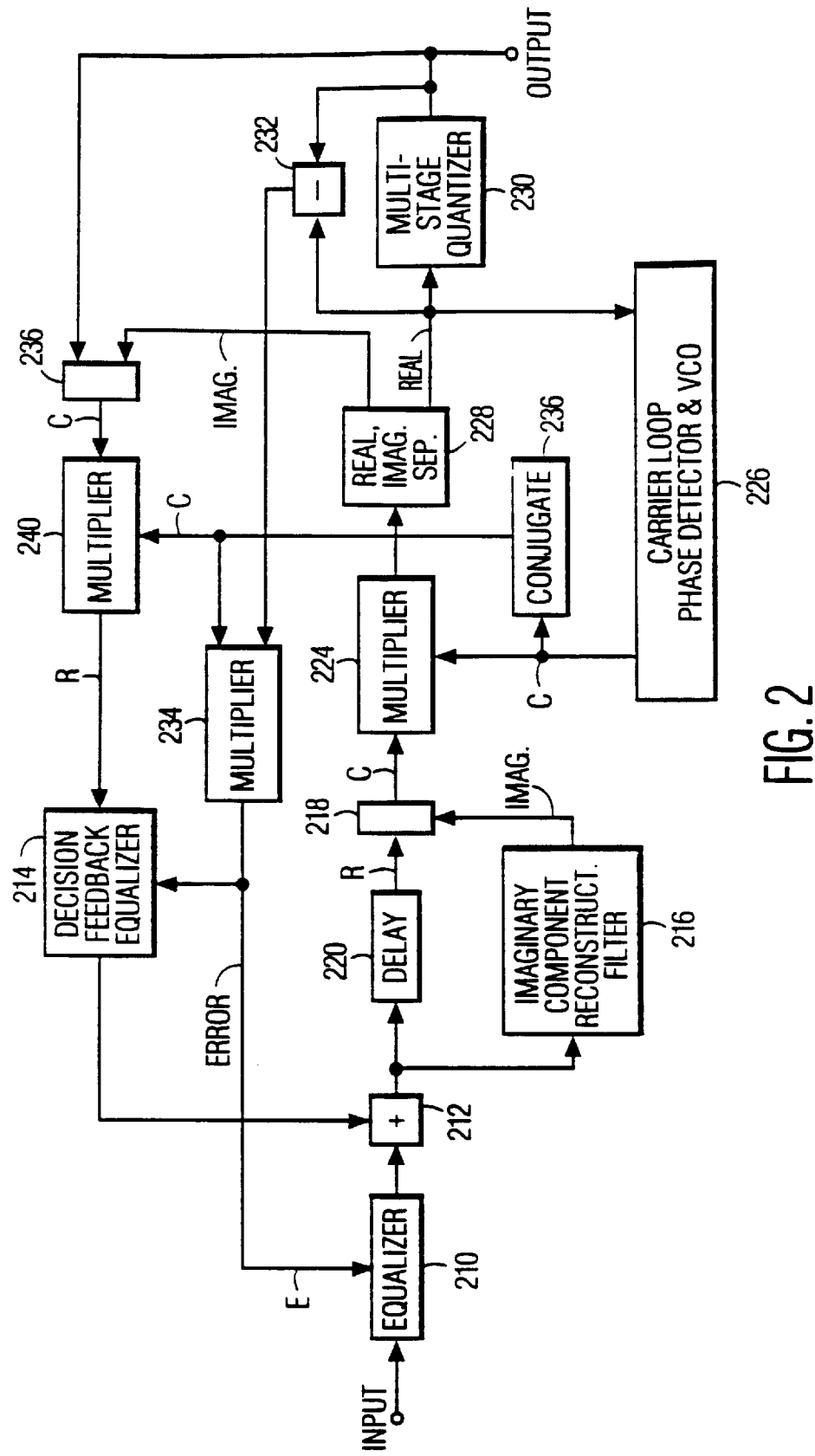
FIG. 2 is a block diagram of another embodiment of an equalizer system in accordance with the principles of the present invention.

The operation of the system shown in FIG. 1 will now be discussed. In this embodiment, equalizer 20 is implemented as an FIR filter with adjustable taps, although other adaptive filter structures may be used. Equalizer 20 is a complex unit with complex input and output. However, equalizer 20 may be a real-only filter which processes only the in-phase real component of the input signal and which has a single real output. A real-only equalizer filter arrangement is shown in FIG. 2 as will be discussed.

The output signal from equalizer 20 is applied to a first (de-)rotator 22, which is of conventional configuration and operates in a well-known manner to compensate for phase errors of an input signal in response to a control signal. Rotator 22, a complex multiplier, is included in a secondary carrier recovery network also including a phase detector network 30 and a network 24 for separating the in-phase real and quadrature imaginary components of the output signal from rotator 22. Networks for separating the real and imaginary components of a complex signal are well-known. The secondary carrier recovery network typically removes residual phase errors in the output signal of equalizer 20 to produce a baseband signal. The secondary carrier recovery network advantageously augments a prior carrier recovery network in processor 18 which typically removes frequency offsets, but which may lack the power to remove all frequency and phase offsets.

The separated real component from network 24 is processed by a real phase detector 32 in network 30 as will be shown and discussed in connection with FIG. 3. An output signal from detector 32 is representative of a phase error of the detector input signal, which is related to the output signal of equalizer 20. The detector 32 output signal is filtered by loop filter 34 (eg., an integrator) to produce a voltage proportional to the phase error. A Voltage Controlled Oscillator (VCO) 36 produces a frequency proportional to this voltage. Thus the output of VCO 36 is a complex signal whose frequency and phase are proportional to the phase error of the output signal from the adaptive equalizer. The output signal from VCO 36 controls the operation of derotator 22 to compensate for phase errors in the output signal of equalizer 20. Specifically, rotator 22 modifies the phase of the input signal as a function of the VCO output signal so as to reduce the phase error to zero.

Using well-known signal processing techniques, the control signal from network 30 is conjugated by unit 64 to remove the imaginary component of the complex control signal from network 30. The resulting real-only control signal from unit 64 is applied to a control input of a second (de-)rotator 62 which will be discussed subsequently. The separated real component from unit 24 is applied to an input of network 50 for processing. Unit 67 processes the separated imaginary component from unit 24 with an output real signal from network 50 to reconstitute a complex signal.

Network 50 is a multistage decision device comprising three parallel quantizer stages (decision devices) 52, 54 and 56 which provide quantized data to a 3:1 time multiplexer 58. Network 50 provides the symbol clustering, decision regions and decision outputs described above as summarized in FIG. 4. The 2-level quantizer 52 is used initially during the first (coarse) level of equalization. When the RMS value of a passband error signal E developed at the output of second rotator 62 falls below a predetermined threshold as sensed by a comparator network in a sensor 66, a Multiplexer (MUX) Control signal is generated by sensor 66. This Control signal causes MUX 58 in network 50 to select the output from the next (finer) level quantizer, eg., from 4-level quantizer 54 at the second level of equalization. The equalizer responds to information derived from the use of this quantizer until the RMS error falls below a predetermined second threshold as also sensed by sensor 66. A Multiplixer Control signal generated for this condition causes network 50 to select the output from the next and last (finest) level quantizer, 8-level quantizer 56 at the third and final level of equalization in this example. Quantizer 56 covers the full 8-VSB constellation. At this point it is expected that equalizer 20 should be able to converge fully.

The input to the non-inverting (+) input of combiner 60 is the complex signal before quantization, and the input to the inverting (−) input of combiner is the complex signal after quantization of the real component. Thus the output signal from combiner 60 represents the before and after quantization difference, or the offset/error from the desired quantization level. This signal represents a baseband phase error. Rotator 22 and rotator 62 are similar complex rotators which rotate in opposite directions (i.e., clockwise and counter-clockwise). The difference in rotating direction is caused by the conjugation of the signal applied to the control input of rotator 62 compared to rotator 22. Error signal E developed at the output of rotator 62 represents the passband phase error that equalizer 20 is intended to remove by adjusting its coefficients in response to error signal E.

Network 50 may use a single adaptive quantizer with a controllable quantization level instead of three separate quantizers 52, 54 and 56 as shown. An equalized baseband signal is decoded by unit 76 and processed by an output processor 78. Decoder 76 may include, for example, de-interleaver, Reed-Solomon error correction, and audio/video decoder networks as known. Output processor 78 may include audio and video processors and audio and video reproduction devices. In a system using a trellis decoder, an input to the trellis decoder may be taken from terminal T1 at the output of first rotator 22.

The system shown in FIG. 2 also performs blind equalization of a near-baseband VSB signal, but uses a real-only equalizer rather than a complex equalizer as used in FIG. 1. In FIG. 2, the real component of a received VSB signal is applied to an input of an adaptive real-only feed-forward equalizer 210. The coefficients of equalizer 210 are adjusted in response to an error signal E (as will be discussed). The real output signal of equalizer 210 is combined in adder 212 with a real output signal from a decision feedback equalizer 214. A filter network 216 reconstructs the imaginary quadrature phase component of the real VSB signal component from the real output of adder 212. This reconstruction is accomplished using known Hilbert transform techniques and is based on the fact that the in-phase real component and the quadrature imaginary component of a VSB signal approximately form a Hilbert transform pair. Unit 218 combines the reconstructed quadrature component from filter 216 and the real component from unit 212 to produce a reconstructed complex VSB signal with an equalized real component. Delay element 220 compensates for a time delay associated with the operation of reconstruction filter 216 to assure that the input signals arrive at adder 218 with time coincidence.

The complex VSB signal from unit 218 is processed by a multiplier (rotator) 224 which operates in the same manner as rotator 22 in FIG. 1, and likewise responds to a complex output signal produced by a VCO in a secondary carrier recovery network 226 corresponding to unit 30 in FIG. 1. As in the case of FIG. 1, carrier recovery network 226 responds to the separated real component of the output signal from rotator 224 as provided by a real/imaginary component separator 228. The real component from unit 228 is processed by a multi-stage quantizer decision network 230 corresponding to network 50 in FIG. 1. An equalized baseband VSB signal appears at the output of quantizer 230 and is conveyed to subsequent signal processing circuits (not shown).

The real input and output signals of quantizer 230 are differenced by a subtractor 232, and the resulting real signal is applied to an input of multiplier 234. The output signal of subtractor represents the difference between the real input signal to quantizer 230 and the quantized real output signal from quantizer 230. Another input of multiplier 234 receives the real signal output from subtractor 232. The imaginary component separated by unit 228 and the equalized real component from the output of quantizer 230 are combined by unit 236 to produce a complex VSB signal which is applied to a signal input of multiplier 240. Another input of multiplier 240 receives a real signal from a conjugation network 236, which inverts the imaginary component in the complex output signal of unit 226.

The output of multiplier 240 is a real passband signal (only the real output of complex multiplier is used). This signal is applied to a signal input of decision feedback equalizer 214, and a control input of equalizer 214 receives an Error output signal (E) from multiplier 234. This Error signal represents a passband error signal and is also applied to input equalizer 210 as a coefficient control signal. The output of equalizer 214 is real and is combined in a unit 212 with the equalized real output signal of equalizer 210. Feedback equalizer 214 removes remaining intersymbol interference not removed by forward equalizer 210. Decision feedback equalizers are well-known. Multi-stage quantizer 230 may be controlled by means of a MUX Control signal in the same manner as shown in FIG. 1, by sensing the Error signal to develop the MUX Control signal which is applied to a multiplexer associated with quantizer 230 as described in connection with FIG. 1.

Figure 3:
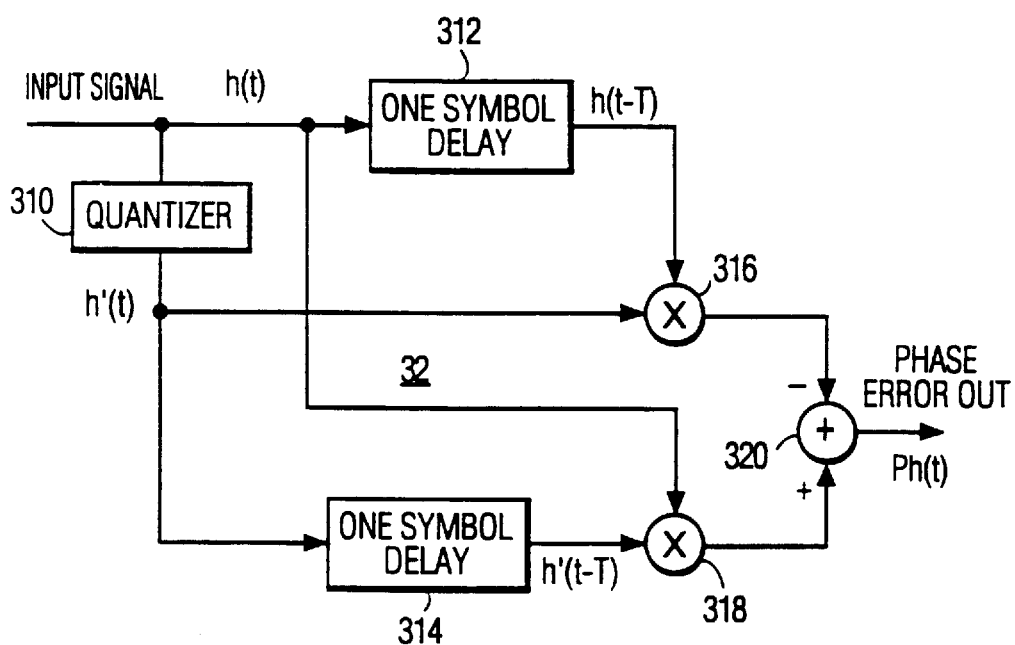
FIG. 3 shows details of a portion of the systems shown in FIGS. 1 and 2.

Phase detector 32 of network 30 in the secondary carrier recovery loop of FIG. 1, and in the corresponding network 226 in FIG. 2, is shown in detail in FIG. 3. Phase detector 32 measures the phase error of the carrier using only the real component of the VSB signal, and produces an output signal that is proportional to the sine of the carrier phase error. Phase detector 32 essentially detects any quadrature phase component in the real component input to the phase detector. Any such quadrature distortion of the real component represents a phase offset error that is manifested at the output of phase detector 32.

The phase detector includes a quantizer 310, symbol delay elements 312 and 314, multipliers 316 and 318, and a subtractive combiner 320 arranged as shown. Quantizer 310 is an eight level quantizer in the case of on 8-VSB signal, a sixteen level quantizer in the case of a 16-VSB signal, and so forth. Delay elements 312 and 314 compensate for a transit time delay associated with the operation of quantizer 310, so that signals arrive at multipliers 314 and 316 in time synchronism. Phase detector 32 is a low latency phase detector with a small (one symbol) delay between input and output, producing good noise tracking.

The phase detector generates a Phase Error Output signal Ph(t) which is proportional to the sine of the phase (angular) error of input signal h(t). This signal is a rotated version of the adaptive equalizer output signal as can be seen from FIG. 1. Phase detector output signal Ph(t) is defined by the expression $$Ph(t)=h(t)*h'(t-T)-h'(t)*h(t-T)$$

where h'(t) is the output of quantizer decision device 310, h(t) is the output of the adaptive equalizer after rotation, and T is a symbol period. Phase detector output signal Ph(t) is proportional to the sine of its input signal, not to a timing offset. The sine function is not a mathematical sine function per se, but results from the shape of the input-output transfer function of phase detector 32.

We claim:

1. In a system for receiving a transmitted signal subject to exhibiting a carrier offset, apparatus comprising:
   an equalizer (20) for performing blind equalization of said received signal; and
   a control network for controlling the operation of said equalizer to produce said blind equalization, said control network including
   (a) a multiple stage iterative quantizer (50) for quantizing output data from said equalizer, said quantizer exhibiting progressively finer resolution quantization levels at respective stages;
   (b) a detector (60,66) responsive to quantized data from said quantizer for generating a control signal; and
   (c) means for coupling said control signal to said equalizer.

2. Apparatus according to claim 1, wherein
   said received signal is a vestigial sideband (VSB) signal formatted as a one-dimensional constellation of data symbols (−7,−5,−3,−1 1,3,5,7) representing digital image data and subject to exhibiting a carrier offset; and
   said quantizer groups said VSB symbol constellation into progressively smaller clusters of symbols (FIG. 4).

3. Apparatus according to claim 2, wherein
   said received signal is an 8-VSB signal; and the quantization stages respectively exhibit 2-level, 4-level and 8-level quantization.

4. Apparatus according to claim 1, wherein said control network further includes means (66) for generating said control signal for controlling the resolution of the output data from said quantizer.

5. Apparatus according to claim 1, and further comprising a first carrier recovery network (18) for providing a near baseband signal to said equalizer; and wherein said control network further develops an error signal (E) representing a carrier error for application to a control input of said equalizer.

6. Apparatus according to claim 1 and further comprising a carrier recovery network (22,30,62) for shifting an output signal from said equalizer toward baseband.

7. Apparatus according to claim 5 and further comprising a second carrier recovery network (22,30,62) for shifting an output signal from said equalizer toward baseband.

8. Apparatus according to claim 1 and further including means (60) for producing a signal representing a difference between an unquantized input to said quantizer and a quantized output from said quantizer, representing a carrier phase error; and means (62) for conveying said difference signal to said equalizer and to said detector.

9. In a system for receiving a transmitted video signal containing a constellation of data symbols representing digital image data and subject to exhibiting a carrier offset, a method used in association with a signal equalizer to achieve blind equalization, said method comprising the steps of:

(a) equalizing said received input signal to produce an output signal;

(b) iteratively quantizing said output signal from said equalizing step in accordance with progressively higher resolution multiple quantization stages, said quantizing comprising the steps of (b1) grouping said constellation of symbols into plural symbol sets;

(b2) quantizing each of said symbol sets at a first stage level of resolution with an associated decision region to produce decision output symbols for each symbol set;

(b3) evaluating said decision output symbols with respect to a threshold value; and (b4) repeating steps (b1) to (b3) as a function of said threshold value for producing progressively finer quantization levels at successive stages;

(c) deriving an error signal as a function of said decision output symbols; and (d) conveying said error signal to a control input of said equalizer.

10. A method in accordance with claim 9, wherein each of the quantization levels comprises the steps of:

grouping said constellation symbols into said plural symbol sets;

evaluating each set with respect to a decision region; and providing the quantization decision symbol outputs on the basis of said decision region evaluation.

11. A method according to claim 9, wherein in said grouping step, said constellation symbols are grouped in progressively smaller sets of symbols; and in said evaluating step, said decision regions exhibit a progressively narrower range.

12. A method according to claim 9, wherein said received signal is a vestigial sideband (VSB) signal formatted as a one-dimensional constellation of data symbols (−7,−5,−3,−1 1,3,5,7).

13. A method according to claim 12, wherein said received signal is an 8-VSB signal; and said quantizing step comprises three quantizing stages respectively exhibiting 2-level, 4-level and 8-level quantization.

14. A method in accordance with claim 9, wherein said steps (b1) to (b3) are repeated until each set contains a single symbol.

15. A method according to claim 9 further comprising the step of modifying decision region values by an offset factor having a value greater than unity.

16. A method according to claim 9 further comprising the step of multiplexing said decision symbol outputs to form an output datastream.

* * * * *